United States Patent
Glock et al.

(10) Patent No.: US 6,789,006 B2
(45) Date of Patent: Sep. 7, 2004

(54) METHOD AND DEVICE FOR DETECTING A DETACHED TIRE

(75) Inventors: Armin Glock, Stuttgart (DE); Stefan Mallmann, Lauffen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/224,798

(22) Filed: Aug. 19, 2002

(65) Prior Publication Data

US 2003/0036831 A1 Feb. 20, 2003

(30) Foreign Application Priority Data

Aug. 18, 2001 (DE) .......................................... 101 40 615

(51) Int. Cl.[7] .................................................. G06F 7/00
(52) U.S. Cl. .......................... 701/29; 701/33; 701/41; 701/75; 701/76; 701/82; 701/83; 701/91; 340/438; 340/441; 340/442; 340/446; 340/447; 303/113.2; 303/140; 180/271; 180/443; 141/1; 141/38; 141/83; 73/146; 73/146.2; 73/146.5; 73/146.8
(58) Field of Search .............................. 701/29, 33, 41, 701/82, 75, 91, 76, 83; 340/447, 438, 441, 446; 303/140, 113.2; 73/146.8, 146, 146.5, 146.2, 709, 723, 753, 756, 8, 9; 180/271, 443; 141/1, 223, 38, 83; 152/415

(56) References Cited

U.S. PATENT DOCUMENTS

| | | | | |
|---|---|---|---|---|
| 4,378,120 A | * | 3/1983 | Laine | .................. 280/154 |
| 4,748,845 A | * | 6/1988 | Rocco et al. | .............. 73/146.8 |
| 5,126,942 A | * | 6/1992 | Matsuda | ...................... 701/75 |
| 5,307,846 A | * | 5/1994 | Heinemann | .................... 141/1 |
| 5,328,255 A | * | 7/1994 | Isella | ......................... 303/140 |
| 5,723,768 A | * | 3/1998 | Ammon | .......................... 73/8 |
| 5,805,449 A | * | 9/1998 | Ito | .............................. 701/41 |
| 6,062,072 A | * | 5/2000 | Mock et al. | .............. 73/146.5 |
| 6,619,353 B1 | * | 9/2003 | Kim | ....................... 152/225 R |
| 2002/0162633 A1 | * | 11/2002 | Mimura | ..................... 157/1.24 |

FOREIGN PATENT DOCUMENTS

| | | |
|---|---|---|
| DE | 196 38 280 | 3/1998 |
| DE | 197 12 097 | 4/1998 |

* cited by examiner

*Primary Examiner*—Thomas G. Black
*Assistant Examiner*—McDieunel Marc
(74) *Attorney, Agent, or Firm*—Kenyon & Kenyon

(57) ABSTRACT

Device for detecting a detached tire of a vehicle. This device includes an arrangement for detecting the rotational movements of the wheels and generating first quantities that are dependent on the rotational movements detected. A comparison arrangement is also provided in which at least one comparison involving at least one of the first quantities is carried out, as well as an evaluation arrangement in which a signal is output as a function of the output of the at least one comparison. The at least one comparison carried out in the comparison arrangement is preceded by a sorting operation in which at least two of the first quantities are sorted by value; and a detached tire is detected as a function of the signal output by the evaluation arrangement.

13 Claims, 2 Drawing Sheets

METHOD AND DEVICE FOR DETECTING A DETACHED TIRE

FIELD OF THE INVENTION

The present invention relates to a system for monitoring the condition of a tire.

BACKGROUND INFORMATION

German Published Patent Application No. 196 38 280 describes a method and a device for generating an error signal in a motor vehicle having at least two wheels located on the right and left in the front and rear areas of the vehicle. This is accomplished by detecting signals that represent the rotational velocities of the vehicle wheels. In particular, cornering is also detected as a function of the detected signals. The signals detected during cornering are then compared with a setpoint performance present during cornering, whereupon the error signal is generated as a function of the comparison. The comparison makes it possible to detect faulty speed sensor signals, for example, due to line reversal.

A system for detecting a status of the wheels of a motor vehicle is known from German Patent No. 197 12 097. This is accomplished by providing an arrangement for generating speed signals representing the rotational movements of the wheels, and an evaluation arrangement that is used to output a signal as a function of the generated signals, representing a display-relevant status. The main idea of German Patent No. 197 12 097 is that the evaluation arrangement is designed so that first difference values for the speed differences of at least two vehicle wheels on the two vehicle sides are first formed as a function of the generated speed signals. The signal representing a display-relevant status is then output as a function of a first comparison of the formed difference values with each other and/or with predefinable first threshold values.

SUMMARY OF THE INVENTION

The present invention relates to a device for monitoring the condition of tires on the wheels of a motor vehicle, an arrangement for detecting the rotational movements of the wheels being provided.

A tire that has become detached from the rim jeopardizes the safety of the vehicle driver:

The detached tire places the vehicle in an unfavorable state. For example, this may be expressed by the vehicle swerving. Detecting a detached tire enables a vehicle dynamics control system to be switched to a special mode that makes it possible to reduce this risk. For example, a defective rear wheel may be depressurized when braking.

The present invention requires a vehicle having an arrangement for detecting the rotational movements of the wheels and generating first quantities that are dependent on the rotational movements detected. The present invention also requires a comparison arrangement in which at least one comparison involving at least one of the first quantities is carried out. An evaluation arrangement is also provided in which a signal is output as a function of the output of the at least one comparison.

The comparison is advantageously preceded by a sorting operation in which at least two of the first quantities are sorted by value. A detached tire is detectable as a function of the signal output by the evaluation arrangement.

The vehicle is advantageously a vehicle that is equipped with an wheel slip control system.

The wheel slip control system is advantageously designed as a vehicle dynamics control system.

In specific system states of the vehicle dynamics control system, the generation of the first quantities advantageously involves a transformation. As a result, the quantities represented by the signals of the arrangement for detecting the rotational movements are transformed onto a common point.

The present invention is advantageously characterized by the fact that, if the vehicle dynamics control system is fully ready for operation or fully active, the first quantities correspond to the wheel speeds that have been transformed onto the center point of a vehicle axle. However, the first quantities may also be proportional to the wheel speeds that have been transformed onto the center point of a vehicle axle. If a vehicle dynamics control system is present, this requires little additional expense, since these quantities are already present in a vehicle dynamics control system.

Since the first quantities have already undergone sorting, the first quantities of the two vehicle wheels whose first quantities have the two highest values may be advantageously compared with each other in a comparison.

A difference between two of the first quantities is formed in at least one further comparison.

If the vehicle dynamics control system is fully ready for operation or fully active or in passive mode, the number of comparisons carried out in the comparison arrangement is then advantageously incremented by one if the comparison arrangement determines that the wheel, whose corresponding first quantity has the highest value, is a driven wheel. In the subsequent, further comparison, the brake pressure specified by the driver is advantageously compared with a limit value. When driving the vehicle on a $\mu$-split roadway, one lane of which is icy, for example, the driven wheel located in the icy lane may spin and thus have a much higher wheel speed. To prevent this situation from erroneously resulting in the detection of a detached tire, the additional condition of the brake pressure is advantageously introduced.

In vehicle dynamics control systems, the brake pressure specified by the driver is frequently measured by the admission pressure sensor between the reversing valve and the main brake cylinder. The reversing valve is the valve that switches mainly between a driver-dependent and a driver-independent braking mode. Other positions of the pressure sensor in the hydraulic circuit are, of course, also conceivable. The important thing is that the pressure there is a measure of the brake pedal actuation executed by the driver.

If the vehicle dynamics control system is not fully ready for operation or not fully active, the brake pressure specified by the driver is compared advantageously with a threshold value in the comparison arrangement.

The vehicle dynamics control system that is not fully ready for operation or not fully active, and not simultaneously in passive mode, is characterized by the fact that at least the anti-lock function is ready for operation or active.

It is advantageous if the evaluation arrangement detects a detached tire if the output of all comparisons carried out in the comparison arrangement continuously indicates a detached tire for a period exceeding a predefinable minimum time period. This eliminates short-term peak values of individual first quantities.

The detection of a detached tire results in the vehicle dynamics control system advantageously switching to a special mode.

DETAILED DESCRIPTION

The present invention relates to a method and a device for detecting a detached tire.

A vehicle equipped with a vehicle dynamics control system is described by way of example.

Figure 1:
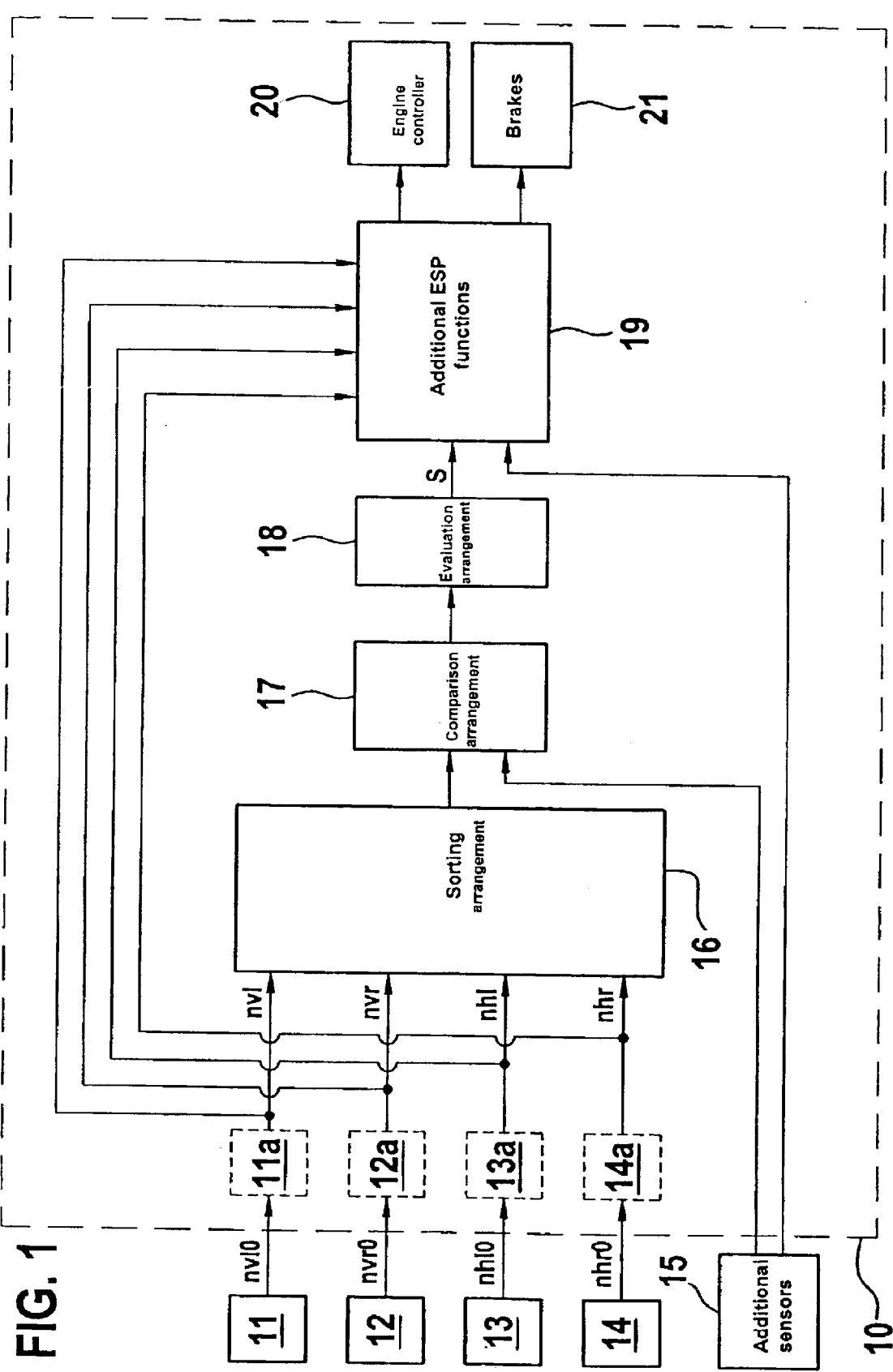
FIG. 1 shows a schematic representation of the structure of the device according to the present invention.

FIG. 1 shows an overview of the present invention. This figure shows a vehicle dynamics control system 10 as a main block. The output signals of sensors 11, 12, 13 and 14 are first shown as input quantities. These sensors are sensors that detect quantities relating to the rotational movement of the wheels. In a preferred embodiment, they may be wheel speed sensors. The output quantities supplied by these sensors 11, 12, 13 and 14 are signals representing the quantities assigned to the wheels. These quantities may be, for example, the wheel speeds or the velocities assigned to the wheels.

Depending on the status of the vehicle dynamics control system, there are two options:

1. Blocks 11a, 12a, 13a and 14a, which are represented by dotted lines, perform a subsequent transformation of the quantities assigned to the wheels into first quantities. This transformation transforms the quantities assigned to the wheels onto a common point.
2. The quantities assigned to the wheels are not transformed into first quantities. The first quantities are thus identical to the quantities assigned to the wheels, and blocks 11a, 12a, 13a and 14a may be disregarded.

The signals supplied by sensors 11, 12, 13 and 14 are thus supplied directly to sorting arrangement 16 (second option), or they first pass through transformation devices 11a, 12a, 13a and 14a (first option).

In addition, the first quantities may be supplied to block 19, which includes additional ESP functions, i.e., functions of the vehicle dynamics control system.

Without restricting the generality, the description below always relates to the special condition that sensors 11, 12, 13 and 14 are wheel speed sensors. The output signals supplied by blocks 11, 12, 13 and 14 are signals that represent non-transformed wheel speeds nvl0, nvr0, nhl0 and nhr0. Transformation devices 11a, 12a, 13a and 14a supply output signals that represent transformed wheel speeds nvl, nvr, nhl and nhr that have been transformed onto a common point. Thus, either quantities nvl0, nvr0, nhl0 and nhr0 or quantities nvl, nvr, nhl and nhr are supplied as input quantities to sorting arrangement 16, depending on whether blocks 11a, 12a, 13a and 14a are present.

In the interest of clarity, the input quantities supplied to sorting arrangement 16, both the non-transformed wheel speeds and the transformed wheel speeds, are always represented by the symbols nvl, nvr, nhl and nhr.

nvl=(transformed) wheel speed, left front wheel
nvr=(transformed) wheel speed, right front wheel
nhl=(transformed) wheel speed, left rear wheel
nhr=(transformed) wheel speed, right rear wheel.

The expression "(transformed)" set in parentheses indicates that the quantities may be either transformed or non-transformed, depending on the system status.

In the interest of simplicity, the vehicle described is one having four wheels. Of course, the present invention is also, in principle, applicable to vehicles having more than four wheels or having more than two axles.

To clarify the following sections, a few explanatory notes on the vehicle dynamics control system are provided.

The motor vehicle is ideally provided with a fully operational vehicle dynamics control system. Non-transformed wheel speeds nvl0, nvr0, nhl0 and nhr0 are transformed onto the center point of a wheel axle, for example the rear axle, in this vehicle dynamics control system. This transformation is useful because, when cornering, the wheels on the inside of the curve rotate more slowly than the wheels on the outside of the curve. The transformation calculates this effect from the wheel speeds so that, even when cornering, all transformed wheel speeds ideally have the same value. In a fully operational vehicle dynamics control system, transformed wheel speeds nvl, nvr, nhl and nhr are used for further processing.

A fully operational vehicle dynamics control system has the following three vehicle dynamics control system states:
1. The vehicle dynamics control system is fully active;
2. The vehicle dynamics control system is fully ready for operation; or
3. The vehicle dynamics control system has been switched to a passive mode. In passive mode, the vehicle control system is prevented from carrying out any vehicle control interventions except for ABS and ASC interventions. The ASC intervention may also be restricted. In many vehicles, the passive mode may be activated by the driver.

However, the vehicle dynamics control system may also have only limited operability. For example, the failure of the transverse acceleration sensor or the yaw rate sensor makes it impossible to regulate the vehicle's transverse dynamics, although the anti-lock functions (in the discussion below, the term "anti-lock functions" refers to the ABS regulating functions) of the vehicle dynamics control system remain unaffected. In this state of limited operability, the vehicle dynamics control system regulates only the anti-lock functions. This status is referred to below as "emergency ABS".

A further restriction of the operability of the vehicle dynamics control system may also prevent fulfillment of the anti-lock functions. In this case, however, the electronic braking force distribution (EBD) may possibly also be carried out by the vehicle dynamics control system. In this system state, the present invention is no longer active, since it lacks the signals needed for implementation.

These limited operability levels of the vehicle dynamics control system are known as fallback levels. If the vehicle dynamics control system is in emergency ABS mode or an even lower fallback level, the wheel speeds are no longer transformed, and non-transformed wheel speeds nvl0, nvr0, nhl0 and nhr0 are used for further processing. Note once again that these quantities are referred to below as nvl, nvr, nhl and nhr. Likewise, both the transformed wheel speeds and the non-transformed wheel speeds are referred to below simply as wheel speeds.

Following this brief explanation, we return to FIG. 1. Output signals from sensors 11, 12, 13 and 14, i.e., blocks 11a, 12a, 13a and 14a, are supplied as input signals to sorting arrangement 16. A sorting operation is carried out here, in which at least some of the wheel speeds corresponding to the sensor signals are sorted according to quantity. As output quantities, sorting arrangement 16 supplies the sorted wheel speeds, which are supplied in signal form, along with additional sensor signals, as input signals to comparison arrangement 17.

The additional sensor signals come from a block 15, which represents additional sensors. These additional sensors may, for example, detect the brake pressure specified by the driver.

At least one comparison is carried out in comparison arrangement 17. The results of the comparisons performed are available as output signals from block 17 and are supplied as input signals to evaluation arrangement 18.

Depending on the comparison results, evaluation arrangement 18 output an output signal S, which is supplied as an input signal to block 19. Block 19 includes all additional functions of vehicle dynamics control system 10.

Output signal S may be in the form, for example, of a suspicion bit, indicating whether a detached tire has been detected. Output signals of sensors 11, 12, 13 and 14 may possibly also be supplied to block 19, which includes the additional functions of vehicle dynamics control system 10, since these output signals are possibly not just used for detecting a detached tire. The output signals from block 19 are supplied, for example, as input signals to engine controller 20 or brakes 21.

Figure 2:
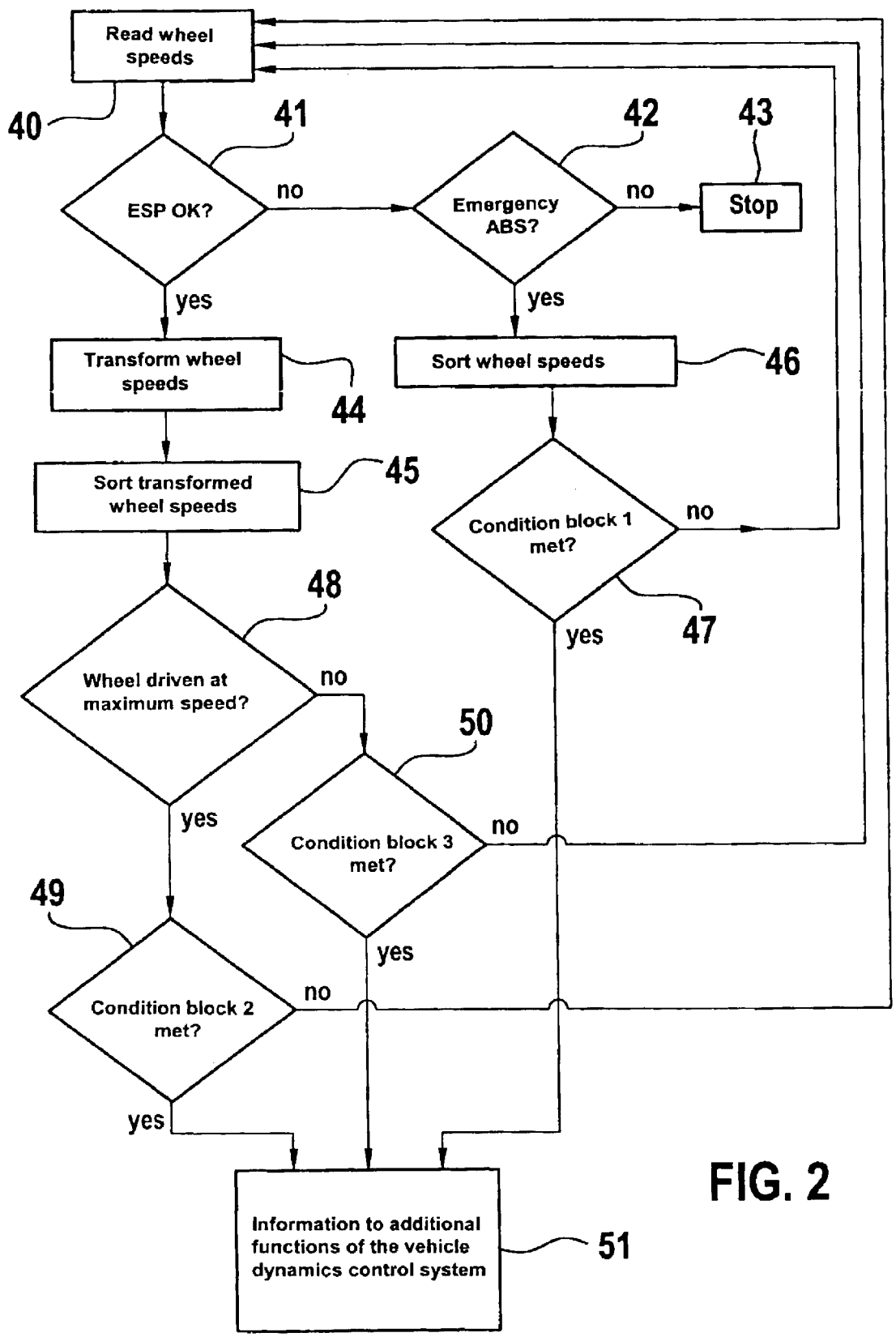
FIG. 2 shows a flow chart of the method sequence for detecting a detached tire.

Now that a general overview of the present invention has been obtained on the basis of FIG. 1, this overview will now be described in greater detail on the basis of FIG. 2.

Block 40 reads the wheel speeds that correspond to the signals supplied by sensors 11, 12, 13 and 14. A subsequent query block 41 checks whether the vehicle dynamics control system is fully ready for operation or in a passive mode or fully active.

If not, query block 42 then checks whether the vehicle dynamics control system is at least in a fallback level that allows at least the anti-lock functions to be carried out.

If query block 42 determines that not even the anti-lock functions may be carried out, block 43 terminates further detection of a detached tire. It is conceivable for the wheel speeds to be read again in block 40 after a certain time interval, thus beginning a new cycle of the method illustrated in FIG. 2.

However, if block 43 determines that the anti-lock functions are executable, block 46 sorts the wheel speeds according to quantity. In this case, n1 would identify the wheel speed of the wheel having the highest wheel speed, n2 the wheel speed of the wheel having the second highest wheel speed, n3 the wheel speed of the wheel having the third highest wheel speed, and n4 the wheel speed of the wheel having the lowest wheel speed. Note that these wheel speeds are not the transformed wheel speeds, i.e., the speed differences between the wheels during cornering are not corrected. Furthermore, note that it is not actually necessary to determine the wheel having third highest wheel speed n3. Determining n1, n2 and n4 is sufficient for properly carrying out the object of the present invention.

Query block 47 then checks various conditions. This query block 47 is also referred to as condition block 1. These conditions are as follows:

1. 45%>((nvl−nhl)−(nvr−nhr))/n1>13%
2. 45%>((nvl−nhr)+(nvr−nhl))/n1>13%
3. p1>15 bar
4. n1>1.05*n2
5. (n2−n4)/n2<0.1

In condition 3, p1 represents the brake pressure specified by the driver. It does not matter whether or not this wheel is driven. The fixed numeric values indicated in the conditions have proven to be especially suitable in tests. It is entirely conceivable to used other numeric values instead.

Condition 4 requires the wheel speed of the fastest wheel (the wheel with the highest wheel speed will be designated thus below) to be at least 5% higher than the wheel speed of the second-fastest wheel. This condition helps ensure the viability of the method.

Condition 5 requires the three wheels not having the fastest wheel speed to lie within a 10% wheel speed range or spin range. In concrete terms, this means that the wheel speed of the slowest wheel should not vary by more than 10% from the wheel speed of the second fastest wheel.

If at least one of the conditions in query block 47 is not met, the wheel speeds are re-read in block 40. If, on the other hand, all conditions are met simultaneously for a settable period of time, the tire of the wheel having the highest wheel speed, i.e., n1, is determined to be detached. In block 51, the information is forwarded to the additional functions of the vehicle dynamics control system.

However, if block 41 determines that the vehicle dynamics control system is fully ready for operation or in a passive mode or fully active, block 44 transforms the wheel speeds onto a common point. This may be the center point of the rear axle.

The transformed wheel speeds are sorted by quantity in block 45. Once again, n1 represents the wheel speed of the wheel having the highest transformed wheel speed, n2 the wheel speed of the wheel having the second highest transformed wheel speed, n3 the wheel speed of the wheel having the third highest transformed wheel speed, and n4 the wheel speed of the wheel having the lowest transformed wheel speed. In this case as well, note that it is sufficient to determine the fastest, second fastest and slowest wheel. This is expressed in the fact that n3 is of no importance to the conditions in the query blocks.

To clarify the remarks, the term "wheel speed" in the description of blocks 48, 49 and 50 always refers to the transformed wheel speed.

Block 48 queries whether the wheel having the highest wheel speed, i.e., n1, is a driven wheel.

If highest wheel speed n1 is assigned to a driven wheel, or if the system is in passive mode, query block 49 then checks various conditions. This query block 49 is also referred to as condition block 2. These conditions are as follows:

1. p1>15 bar
2. (n1−n2)/n1>0.11
3. (n2−n4)/n2<0.05

For the meaning of the conditions, refer to the description of condition block 1.

If at least one of the conditions in query block 49 is not met, the wheel speeds are re-read in block 40. If, on the other hand, all conditions are met simultaneously for a settable period of time, the tire of the wheel having the highest wheel speed, i.e., n1, is determined to be detached, and the information is forwarded to the additional functions of the vehicle dynamics control system in block 51.

If, however, highest wheel speed n1 is assigned to a non-driven wheel, block 48 branches to query block 50. Query block 50 is also referred to as condition block 3. The conditions in query block 50 are as follows:

1. (n1−n2)/n1>0.11
2. (n2−n4)/n2<0.05

If at least one of the conditions in query block 50 is not met, the wheel speeds are re-read in block 40. If, on the other hand, all conditions are met simultaneously for a settable period of time, the tire of the wheel having the highest wheel speed, i.e., n1, is determined to be detached. In block 51, the information is forwarded to the additional functions of the vehicle dynamics control system.

Once again, note that the fixed numeric values indicated in the conditions have proven to be especially suitable in tests. It is entirely conceivable to used other numeric values instead.

It has proven to be advantageous if the detachment of a tire from the wheel is detected and a suspicion bit set only if all conditions are met continuously over a predefinable period of time in condition block 1 or in condition block 2 or in condition block 3. In practice, a value of 700 milliseconds has proven to be suitable. This filtration ensures that short-term disturbances or peak values do not erroneously result in the detection of a detached tire.

Once a detached tire has been detected, the vehicle dynamics control system switches to another mode that increases vehicle stability. In this mode, the wheel whose tire has become detached undergoes special treatment.

When the detachment of a tire from the wheel is detected, it is advantageous to set a suspicion bit.

The suspicion bit is reset in all states of the vehicle dynamics control system if:

1. when the conditions are evaluated not all conditions are met simultaneously for a predefinable time interval in condition block 1 or condition block 2 or condition block 3, i.e., there is no longer any reason to suspect a detached tire, and braking has been completed; or
2. the vehicle is at a standstill.

A value of 700 milliseconds has proven to be suitable in practice for the length of the predefinable time interval. Of course, other time interval lengths are also possible.

After detecting a detached tire, it is, of course, also possible to activate a driver notification system.

What is claimed is:

1. A device for detecting a tire that has become detached from a vehicle, comprising:
   an arrangement for detecting rotational movements of wheels and generating a plurality of first quantities that are functions of the rotational movements that are detected;
   a comparison arrangement in which at least one comparison involving the first quantities is performed;
   an evaluation arrangement for providing a signal that is output as a function of an output of the at least one comparison; and
   a sorting arrangement for performing, prior to the at least one comparison, a sorting operation in which at least two of the first quantities are sorted by value, wherein:
   the detached tire is detected as a function of the signal output by the evaluation arrangement.

2. The device as recited in claim 1, wherein:
   the vehicle is equipped with a wheel slip control system.

3. The device as recited in claim 2, wherein:
   the wheel slip control system includes a vehicle dynamics control system.

4. The device as recited in claim 3, wherein:
   in specific system states of the vehicle dynamics control system, a generation of the first quantities involves a transformation of quantities represented by signals of the arrangement for detecting the rotational movements onto a common point.

5. The device as recited in claim 4, wherein:
   the transformation is performed if the vehicle dynamics control system is one of fully ready for operation and fully active.

6. The device as recited in claim 1, wherein:
   the first quantities of the two vehicle wheels whose first quantities have the two highest values are compared with each other in the at least one comparison.

7. The device as recited in claim 6, wherein:
   a difference between the two of the first quantities having the highest values is formed in at least one further comparison.

8. The device as recited in claim 7, wherein:
   if a vehicle dynamics control system is one of fully ready for operation, fully active, and in passive mode, a number of comparisons carried out in the comparison arrangement is incremented by one if the comparison arrangement determines that the wheel whose corresponding first quantity has the highest value is a driven wheel.

9. The device as recited in claim 8, wherein:
   a brake pressure specified by a driver is compared with a threshold value during an additional comparison, which was added through the determination that the wheel whose corresponding first quantity has the highest value is a driven wheel.

10. The device as recited in claim 8, wherein:
    if the vehicle dynamics control system is one of not fully ready for operation and not fully active, and not simultaneously in a passive mode, at least an anti-lock function is one of ready for operation and active.

11. The device as recited in claim 7, wherein:
    if the vehicle dynamics control system is one of not fully ready for operation and not fully active, a brake pressure specified by a driver is compared to a threshold value in the comparison arrangement.

12. The device as recited in claim 1, wherein:
    the evaluation arrangement detects the detached tire if outputs of all comparisons carried out one of regularly and irregularly in the comparison arrangement continuously indicates the detached tire for a period exceeding a predefinable minimum time period.

13. A method of detecting a tire that has become detached from a vehicle, comprising:
    detecting rotational movements of wheels and generating first quantities that are a function of the rotational movements that are detected;
    executing at least one comparison involving at least one of the first quantities in a comparison arrangement;
    causing an evaluation arrangement to output a signal as a function of an output of the at least one comparison;
    executing a sorting operation prior to the at least one comparison in which at least two of the first quantities are sorted by value; and
    detecting the detached tire as a function of the signal output by the evaluation arrangement.

* * * * *